United States Patent [19]

Mori et al.

[11] Patent Number: 5,003,480
[45] Date of Patent: Mar. 26, 1991

[54] FOUR WHEEL STEERING SYSTEM FOR VEHICLE

[75] Inventors: Kazunori Mori, Ebina; Fukashi Sugasawa, Yokohama, both of Japan

[73] Assignee: Nissan Motor Co., Ltd., Yokohama, Japan

[21] Appl. No.: 354,263

[22] Filed: May 19, 1989

[51] Int. Cl.$^5$ .............................................. B62D 5/06
[52] U.S. Cl. ................................ 364/424.05; 280/91; 180/140; 180/142
[58] Field of Search ...................... 364/424.05; 280/91, 280/99; 180/79.1, 140–143

[56] References Cited

U.S. PATENT DOCUMENTS

| | | | |
|---|---|---|---|
| 4,666,013 | 5/1987 | Shibahata et al. | 364/424.05 |
| 4,705,131 | 11/1987 | Shibahata et al. | 180/140 |
| 4,840,389 | 6/1989 | Kawabe et al. | 180/140 |

Primary Examiner—Gary Chin
Attorney, Agent, or Firm—Foley & Lardner

[57] ABSTRACT

A steering control system for a vehicle includes an actuator for steering rear wheels in response to a control signal, a steering angle sensor, a vehicle speed sensor, and controller for controlling a rear wheel steer angle by producing the control signal according to the following transfer function;

$$\frac{\delta_r(s)}{\delta_f(s)} = \frac{a_0 s^2 + a_1 s + a_2}{a_3 s^2 + a_4 s + a_5}$$

where $a_0$, $a_1$, $a_2$, $a_3$, $a_4$ and $a_5$ are parameters whose values are determined by the vehicle speed, vehicle constants determined by the specification of the vehicle, and desired constants representing a preset desired steering characteristic.

8 Claims, 4 Drawing Sheets

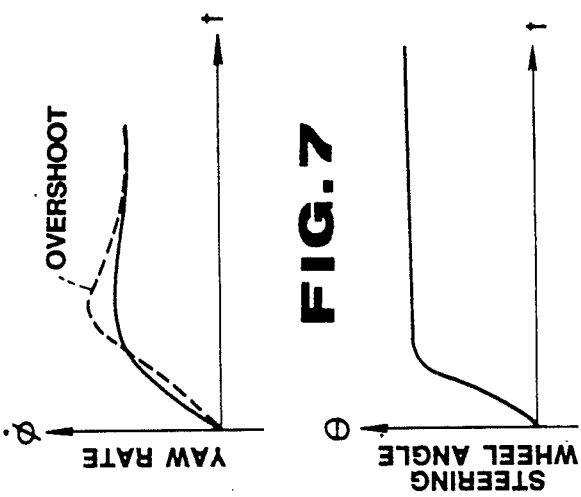
FIG. 6
FIG. 7
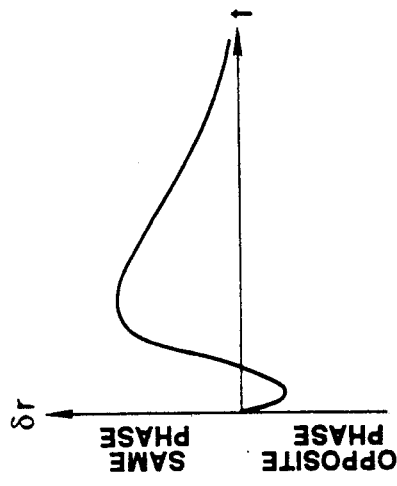
FIG. 8
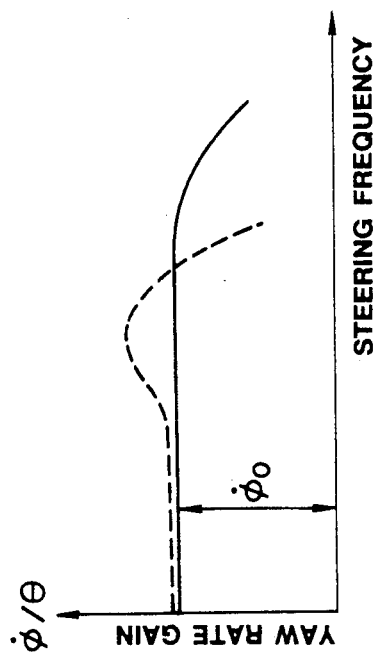
FIG. 4
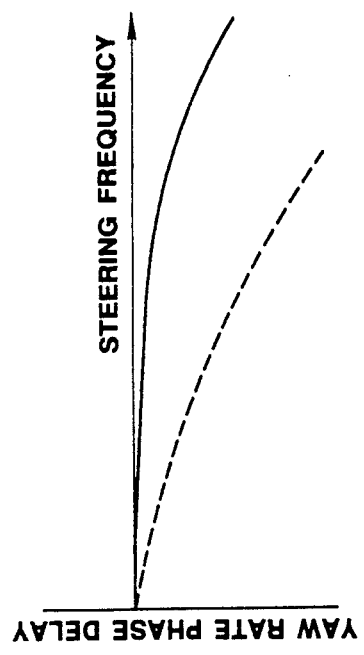
FIG. 5

FOUR WHEEL STEERING SYSTEM FOR VEHICLE

REFERENCE TO RELATED APPLICATION

A commonly assigned, pending U.S. patent application, Ser. No. 07/195,078, filed by Kazunori MORI on May 17, 1988, for "SYSTEM FOR CONTROLLING STEER ANGLE OF REAR WHEELS OF FOUR WHEEL STEERABLE MOTOR VEHICLE" shows a transfer function expressed as;

$$\frac{\delta_r(S)}{\delta_f(S)} = \frac{BS^2 + CS + D}{AS + 1}$$

where S is a Laplace operator, A, B, C, D are functions of the vehicle speed.

BACKGROUND OF THE INVENTION

The present invention relates to a vehicle steering control system for controlling a rear wheel steer angle.

Japanese Patent Provisional Publication No. 59-186773 shows one conventional example. A four wheel steering system of this example has a vehicle speed sensor, a sensor for sensing a front wheel steer angle, and a controller for controlling a rear wheel steer angle in accordance with the vehicle speed and the front wheel steer angle. In medium and high vehicle speed ranges, the controller of this example steers the rear wheels in a direction opposite to the steering direction of the front wheels for a predetermined limited time interval starting from an initiation of a front wheel steering operation, and steers the rear wheels in the same direction as the front wheel steering direction after the expiration of the predetermined time interval.

However, this conventional steering control system is arranged to control the rear wheel steer angle in accordance with only the vehicle speed and the front wheel steer angle, so that it is not possible to achieve a preset desired vehicle characteristic, and to sufficiently improve the transient steering response characteristic and the stability of the vehicle. Specifically, as to the yaw rate frequency response, it is difficult to make the yaw rate gain flat to the high frequency region, or to reduce the phase delay. Moreover, it is difficult to eliminate undesired overshoot occurring when a step steering input is applied as in lane change.

SUMMARY OF THE INVENTION

It is therefore an object of the present invention to provide a steering system which can faithfully achieve a preset desired vehicle characteristic and which can satisfactorily improve the steering response characteristic and stability of the vehicle.

According to the present invention, a steering system for a vehicle comprises an actuator means for varying a rear wheel steer angle in response to a control signal representing the rear wheel steer angle, a sensor means for sensing conditions of said vehicle to determine a front wheel steer angle and a vehicle speed of the vehicle, and a controller means which is connected with the sensor means, for producing the control signal. The controller means of the invention is arranged to control the rear wheel steer angle so that the rear wheel steer angle is related to the front wheel steer angle by the following transfer function.

$$\frac{\delta_r(s)}{\delta_f(s)} = \frac{a_0 s^2 + a_1 s + a_2}{a_3 s^2 + a_4 s + a_5} \quad (1)$$

In this equation, $\delta_f(s)$ is the Laplace transform of the front wheel steering angle, $\delta_r(s)$ is the Laplace transform of the rear wheel steer angle, s is a Laplace operator, and $a_0, a_1, a_2, a_3, a_4$ and $a_5$ are parameters whose values are determined by the vehicle speed.

The controller means may comprises a signal generating means whose transfer function between its input and output is equal to the above-mentioned transfer function, and a parameter determining means which receives the vehicle speed from the sensor means, determines instantaneous values of the six parameters, and sends the values of the parameters to the signal generating means. The signal generating means of the controller means generates the output signal representing the rear wheel steer angle in accordance with the transfer function by regarding each of the parameters as a constant. FIG. 9 schematically shows one example of the steering system of the invention.

BRIEF DESCRIPTION OF THE DRAWINGS

FIG. 4 is a graph showing a characteristic of a yaw rate gain with respect to a steering frequency.

FIG. 5 is a graph showing a characteristic of a phase lag of the yaw rate, with respect to the steering frequency.

FIG. 6 is a graph showing a response of the yaw rate to a step steering input.

FIG. 7 is a graph showing a characteristic of the steering wheel angle, obtained when a step input is applied to the steering wheel angle.

FIG. 8 is a graph showing a response provided by the control system of the embodiment to eliminate an overshoot shown in FIG. 6.

DETAILED DESCRIPTION OF THE INVENTION

Figure 1:
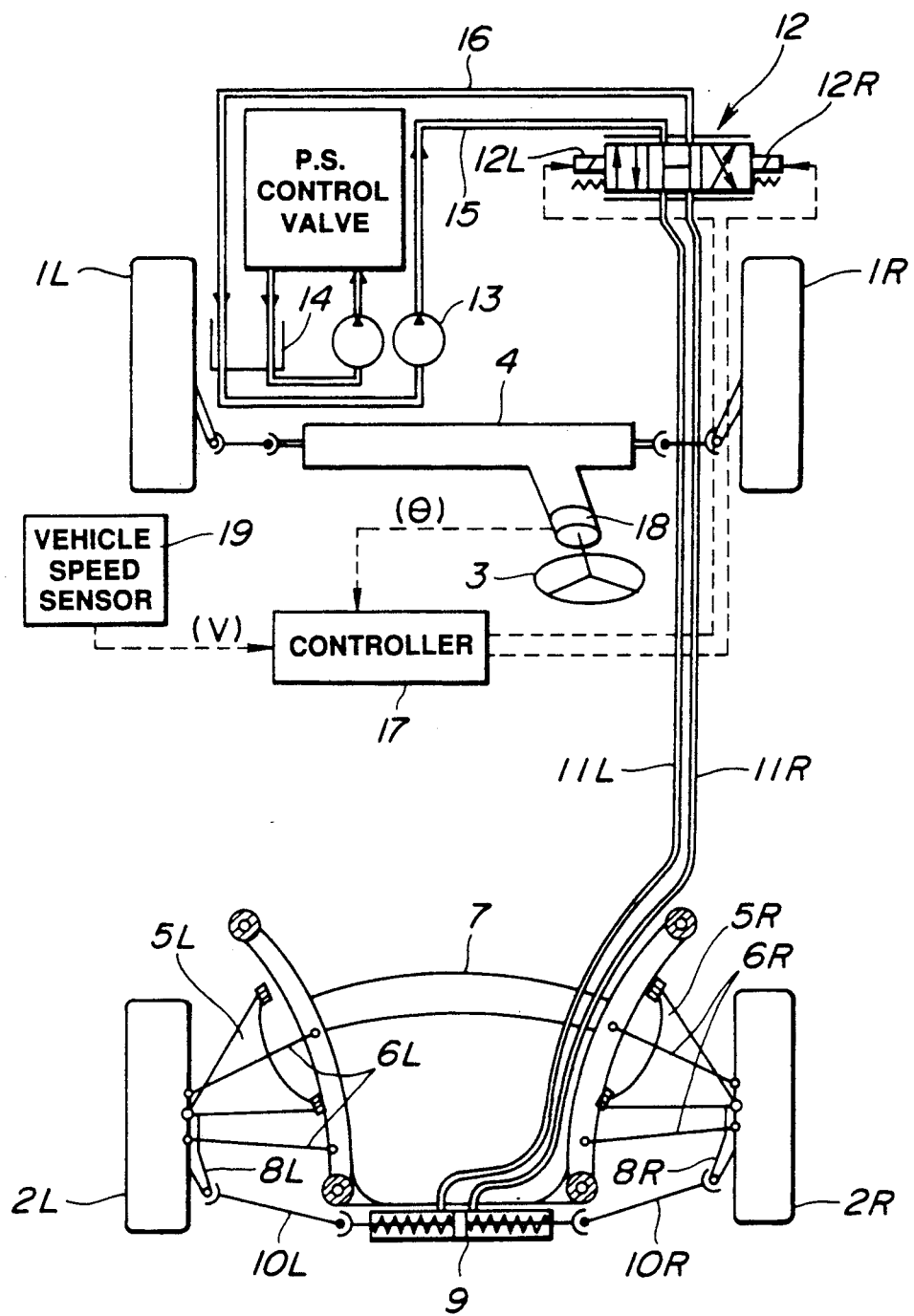
FIG. 1 is a schematic view of a four wheel steering vehicle equipped with a control system according to one embodiment of the present invention.
Figure 2:
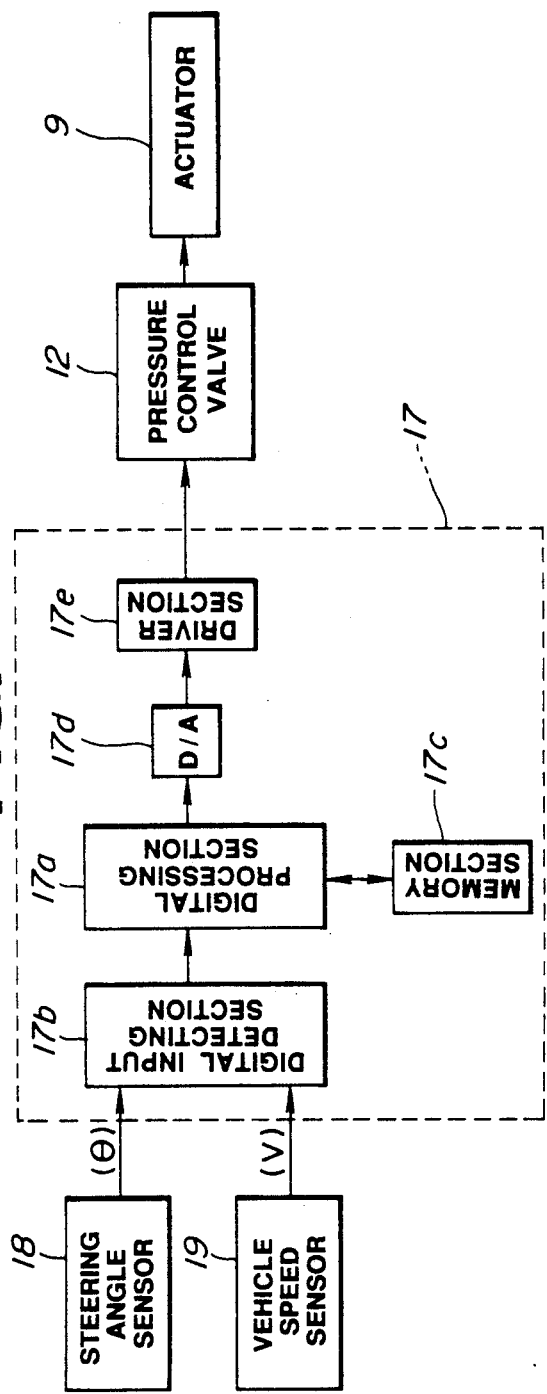
FIG. 2 is a block diagram of the control system of the embodiment.

One embodiment of the present invention is shown in FIGS. 1 and 2.

A vehicle shown in FIG. 1 includes left and right front wheels 1L and 1R, left and right rear wheels 2L and 2R, and a steering wheel 3.

The front wheels 1L and 1R are connected with the steering wheel 3 through a steering gear 4 in a conventional manner. In this front wheel steering linkage system, the front wheel steer angle $\delta_f$ is given by $\delta_f = \theta/N$ where $\theta$ is a steering wheel angle, and N is a steering gear ratio.

The rear wheels 2L and 2R are connected to a rear suspension member 7 of the vehicle body by a rear suspension arrangement which includes transverse links 5L and 5R, and upper arms 6L and 6R. An actuator 9 for steering the rear wheels is provided between knuckle arms 8L and 8R of the left and right rear wheels 2L and 2R. Both ends of a piston rod of the steering actuator 9 are connected with the knuckle arms 8L and 8R through left and right side rods 10L and 10R.

The rear wheel steering actuator 9 of this embodiment is a spring center type double acting hydraulic cylinder actuator. Left and right pressure chambers of the actuator 9 are connected with an electromagnetic proportional pressure control valve 12, respectively, through left and right fluid passages 11L and 11R. The control valve 12 is further connected with a pressure supply passage 15 and a drain passage 16 of a pressure source having a pump 13 and a reservoir tank 14. There is further provided a power steering control valve (P.S. control valve).

The control valve 12 of this embodiment is a spring center type three position valve having left and right solenoids 12L and 12R. When both solenoids 12L and 12R are off, the control valve 12 holds the left and right fluid passages 11L and 11R at a non-pressure state. When the left solenoid 12L is energized, the control valve 12 supplies a fluid pressure proportional to the energizing current, to the left pressure chamber of the actuator 9 through the left passage 11L. When the right solenoid 12R is energized, the control valve 12 supplies a fluid pressure proportional to the energizing current, to the right pressure chamber of the actuator 9 through the right passage 11R.

A controller 17 is provided for electronically controlling a rear wheel steer angle by controlling solenoids 12L and 12R of the control valve 12. The controller 17 can energize and deenergize the solenoids 12L and 12R, and control the amounts of the energizing currents of the solenoids 12L and 12R. As shown in FIG. 2, the controller 17 of this embodiment includes a digital processing section (or circuit) 17a, a digital input detecting section (or circuit) 17b, a memory section (or circuit) 17c, a digital-to-analog converter 17d, and a driver section (or circuit) 17e.

A steering angle sensor 18 and a vehicle speed sensor 19 are connected with the controller 17. The steering angle sensor 18 of this embodiment is a steering wheel angle sensor for sensing a steering wheel angle $\theta$ which is an angular displacement of the steering wheel 3. The vehicle speed sensor 19 senses a vehicle speed V of the vehicle. Signals of the steering angle sensor 18 and the vehicle speed sensor 19 are inputted into the processing section 17a through the input detecting section 17b.

The processing section 17a of the controller 17 computes the before-mentioned six parameters $a_0$, $a_1$, $a_2$, $a_3$, $a_4$ and $a_5$ by using the vehicle speed V and constants stored in a ROM of the memory section 17c, and temporarily stores the values of the parameters in a RAM of the memory section 17c. Then, the processing section 17a solves the before-mentioned equation (1) for the rear wheel steer angle $\delta_r$ by using the steering angle $\theta$ and the temporarily stored values of the parameters $a_0$, $a_1$, $a_2$, $a_3$, $a_4$ and $a_5$. The digital-to-analog converter 17d converts an digital signal representing the thus-determined rear wheel steer angle $\delta_r$, into an analog signal. The driver section 17e converts the thus-obtained analog signal into a current i corresponding to the rear wheel steer angle $\delta_r$, and supplies the current i to the control valve 12. The controller 17 determines which one of the solenoids 12L and 12R is to be energized, from the steering angle $\theta$, and supplies the energizing current i to the solenoid 12L or 12R to make the control valve 12 produce the fluid pressure corresponding to the current i (the rear wheel steer angle $\delta_r$). Therefore, the actuator 9 steers the rear wheels 2L and 2R through the side rods 10L and 10R. In this way, the controller 17 can control the steering amount and direction of the rear wheels 2L and 2R.

The control transfer function (1) of the present invention is obtained in the following manner.

Figure 3:
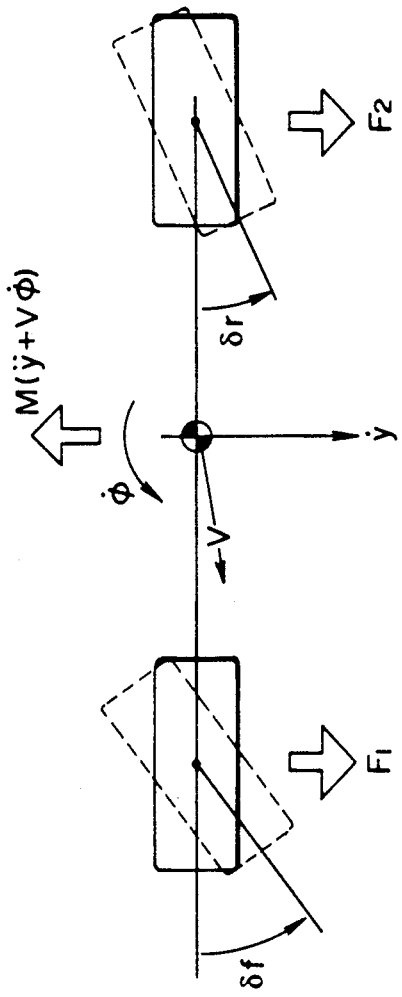
FIG. 3 is a schematic view of a simplified vehicle model for illustrating physical quantities used in the present invention.
Figure 9:
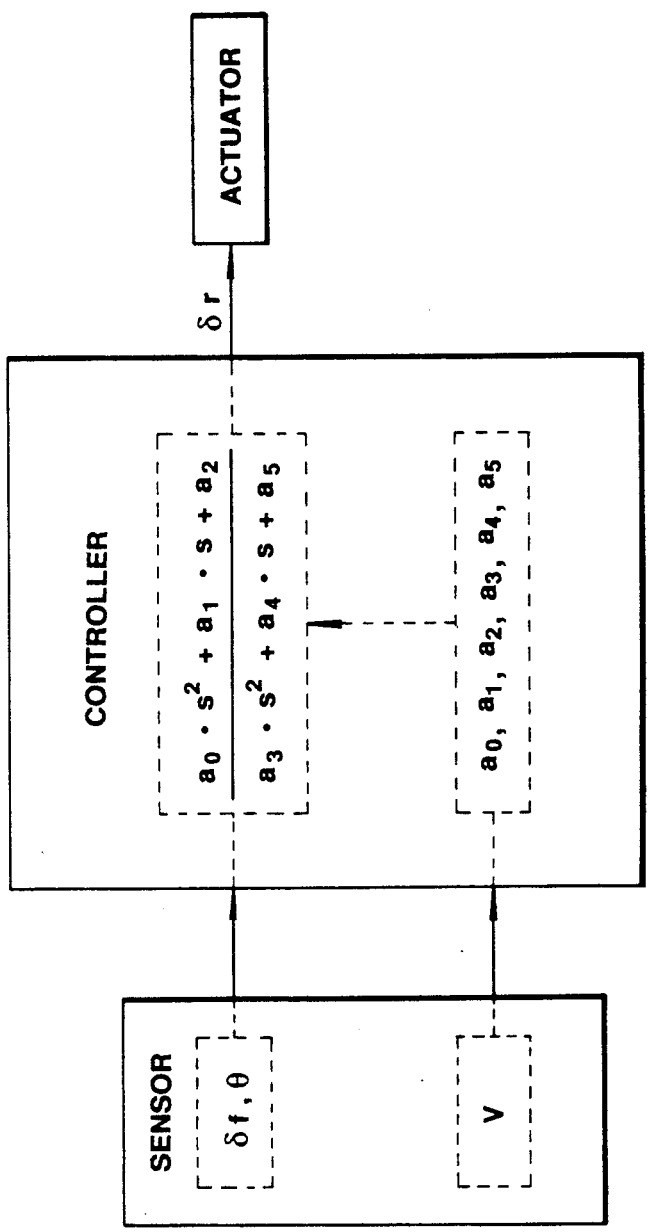
FIG. 9 is a block diagram schematically showing a basic arrangement of a control system according to the present invention.

The following equations (a) and (b) are equations of vehicle motion (cf. FIG. 3).

$$M(\ddot{y} + V \cdot \dot{\phi}) = F_1 + F_2 \tag{a}$$

$$I \cdot \ddot{\phi} = a \cdot F_1 - b \cdot F_2 \tag{b}$$

In these equations, M is a vehicle mass, $\ddot{y}$ is a side acceleration of the vehicle, V is the vehicle speed, $\dot{\phi}$ is a yaw rate, $F_1$ is a front wheel side force, $F_2$ is a rear wheel side force, I is a yawing moment of inertia of the vehicle, $\ddot{\phi}$ is a yaw acceleration, "a" is a distance from a center of gravity of the vehicle to a front axle, and "b" is a distance from the center of gravity of the vehicle to a rear axle. The side forces $F_1$ and $F_2$ are given by;

$$F_1 = C_1 \left( \delta_f - \frac{\dot{y} + a \cdot \dot{\phi}}{V} \right) \tag{c}$$

$$F_2 = C_2 \left( \delta_r - \frac{\dot{y} - b \cdot \dot{\phi}}{V} \right) \tag{d}$$

where $C_1$ is an equivalent front wheel cornering power, $C_2$ is an equivalent rear wheel cornering power, $\delta_f$ is the front wheel steer angle, $\delta_r$ is the rear wheel steer angle, and $\dot{y}$ is a side speed of the vehicle.

In this embodiment, the following equation (2) is employed as a desired vehicle characteristic. The desired characteristic of this embodiment is a vehicle yaw rate characteristic with respect to the front wheel steer angle (or the steering wheel angle).

$$\frac{\dot{\phi}(s)}{\delta_f(s)} = \frac{K}{1 + \tau \cdot s} \dot{\phi}_0 \tag{2}$$

In the equation (2), $\dot{\phi}_0$ is a steady state yaw rate gain of the base vehicle, K and $\tau$(tau) are constants, s is a Laplace operator. The steady state yaw rate gain $\dot{\phi}_0$ is given by:

$$\dot{\phi}_0 = \frac{C_1 C_2 l V}{C_1 C_2 l^2 + M V^2 (b C_2 - a C_1)}$$

In this equation, l is a wheel base and given by $l = a + b$. By using the equation (2), and Laplace transforms of the equations (a)–(d), we can obtain the following equation corresponding to the equation (1), and six additional equations for determining the parameters appearing in the equation (1).

$$\frac{\delta_r(s)}{\delta_f(s)} = \frac{a_0 s^2 + a_1 s + a_2}{a_3 s^2 + a_4 s + a_5}$$

$$a_0 = C_1 a M \tau - \frac{C_1 C_2 l V K M}{C_1 C_2 l^2 + (C_2 b - C_1 a) M V^2}$$

$$a_1 = C_1 a M + \frac{C_1 C_2 l \tau}{V} - \frac{1}{V} \{(C_1 + C_2) I +$$

-continued $$(C_1a^2 + C_2b^2)M\} \times \frac{C_1C_2lVK}{C_1C_2l^2 + (C_2b - C_1a)MV^2}$$

$$a_2 = \frac{C_1C_2l}{V}(1 - K)$$

$$a_3 = C_2bM\tau$$

$$a_4 = \frac{C_1C_2l\tau}{V} + C_2bM$$

$$a_5 = \frac{C_1C_2l}{V}$$

In this embodiment, the yaw rate characteristic $\dot{\phi}(s)/\delta_f(s)$ is used as the desired vehicle characteristic, and the yaw rate characteristic is in the form of a first order lag. The controller 17 determines an instantaneous value of each parameter (or coefficient) $a_i$ (where i is any whole number from 0 to 5; $0 \leq i \leq 5$) by using the predetermined desired yaw rate characteristic, and controls the rear wheel steer angle according to the control transfer function specified by the values of the parameters $a_i$. In this way, the control system of the embodiment can achieve the predetermined desired vehicle characteristic. Each of the numerator and denominator of the control transfer function of the invention contains a term of a second order (including $s^2$), a term of a first order (including s), and a term of a constant. Therefore, the control system of the invention can faithfully achieve the preset desired vehicle characteristic by controlling the rear wheel steer angle in accordance with not only the front wheel steer angle, but also the angular speed and the angular acceleration of the front wheels.

FIGS. 4-8 shows performances which can be attained by the control system of the invention. The control system of the invention can make flat the frequency response characteristic curve of the yaw rate gain in a very wide frequency range as shown by a solid line in FIG. 4, and can decrease the yaw rate phase delay as shown by a solid line in FIG. 5.

When the steering wheel angle is changed like a step change as shown in FIG. 7, the yaw rate of the vehicle tends to respond excessively so that an undesired overshoot is produced as shown by a broken line in FIG. 6. The control system of the invention can eliminate the overshoot, as shown by a solid line in FIG. 6, by controlling the rear wheel steer angle as shown in FIG. 8 in response to the step input. As shown in FIG. 8, the rear wheels 2L and 2R are first steered in an opposite phase direction which is opposite to a steering direction of the front wheels 1L and 1R, during a limited time interval, and then steered in the same phase direction which is the same as the steering direction of the front wheels. After that, the rear wheel steer angle decreases to zero at a pace of a predetermined time constant.

Although this embodiment employs the desired yaw rate gain $\dot{\phi}/\theta$ given by the equation (2) as the desired vehicle characteristic, it is possible to employ a vehicle characteristic expressed in the form of "first-order/second-order", or in the form having a higher order.

As explained above, the control system of the present invention can faithfully achieve the preset vehicle characteristic, so that the present invention makes easier the tuning of vehicle characteristics.

Furthermore, the present invention makes it possible to obtain a superior yaw rate characteristic having a flat gain curve and a low phase delay, and to eliminate an undesired overshoot.

What is claimed is:

1. A steering system for a vehicle, comprising;
   actuator means for varying a rear wheel steer angle in response to a control signal representing said rear wheel steer angle,
   sensor means for determining a front wheel steer angle and a speed of said vehicle, and
   controller means, connected with said sensor means, for producing said control signal in accordance with a transfer function expressed as;

$$\frac{\delta_r(s)}{\delta_f(s)} = \frac{a_0s^2 + a_1s + a_2}{a_3s^2 + a_4s + a_5}$$

where $\delta_f(s)$ is a Laplace transform of said front wheel steer angle, $\delta_r(s)$ is a Laplace transform of said rear wheel steer angle, s is an operator used in Laplace transformation, and $a_0$, $a_1$, $a_2$, $a_3$, $a_4$ and $a_5$ are first, second, third, fourth, fifth, and sixth parameters which are determined in accordance with said vehicle speed, vehicle constants determined by said vehicle, and a desired characteristic, said first, second, third, fourth, fifth and sixth parameters $a_0$, $a_1$, $a_2$, $a_3$, $a_4$ and $a_5$ being determined in accordance with first, second, third, fourth, fifth and sixth equations expressed as;

$$a_0 = C_1aM\tau - \frac{C_1C_2lVK.MI}{C_1C_2l^2 + (C_2b - C_1a)MV^2}$$

$$a_1 = C_1aM + \frac{C_1C_2l\tau}{V} - \frac{1}{V}\{(C_1 + C_2)I +$$

$$(C_1a^2 + C_2b^2)M\} \times \frac{C_1C_2lVK}{C_1C_2l^2 + (C_2b - C_1a)MV^2}$$

$$a_2 = \frac{C_1C_2\tau}{V}(1 - K)$$

$$a_3 = C_2bM\tau$$

$$a_4 = \frac{C_1C_2l\tau}{V} + C_2bM$$

$$a_5 = \frac{C_1C_2l}{V}$$

where V is said vehicle speed, M is a constant representing a mass of said vehicle, I is a constant representing a yawing moment of inertia of said vehicle, $C_1$ is a constant representing a front wheel cornering power of said vehicle, $C_2$ is a constant representing a rear wheel cornering power, a is a constant representing a distance from a center of gravity of said vehicle to a front axle, b is constant representing a distance from said center of gravity to a rear axle of said vehicle, l is a wheelbase and equal to a+b, and K and $\tau$ are constants specifying a predetermined desired yaw rate response characteristic.

2. A steering system according to claim 1 wherein said controller means comprises signal generating means which receives an input signal proportional to said front wheel steer angle, and which generates an output signal representing said rear wheel steer angle so that a ratio of a Laplace transform of said output signal to a Laplace transform of said input signal is proportional to said transfer function.

3. A steering system according to claim 2 wherein said controller means comprises parameter determining means for determining values of said parameters in accordance with said vehicle speed, and said generating means is connected with said parameter determining means and generates said output signal in accordance with said transfer function by treating each of said parameters as a constant.

4. A steering system according to claim 3 wherein said sensor means comprises a steering angle sensor for sensing a steering wheel angle of said vehicle, and a vehicle speed sensor for sensing said vehicle speed, and said controller means further comprises input means, connected with said steering angle sensor, for generating said input signal which is proportional to said steering wheel angle.

5. A steering system according to claim 4 wherein said steering system further comprises a steering linkage connected between a steering wheel and front wheels of said vehicle so that said front wheel steer angle of said front wheels is held substantially equal to a product obtained by multiplying said steering wheel angle by a steering gear ratio.

6. A steering system according to claim 5 wherein said controller means further comprises storage means for storing values of said constants used by said parameter determining means.

7. A steering system according to claim 1, wherein said parameter $a_3$ is independent of said vehicle speed.

8. A steering system according to claim 5 wherein said parameter determining means comprises first, second, third, fourth, fifth and sixth calculating means for calculating said fist, second, third, fourth, fifth and sixth parameters $a_0$, $a_1$, $a_2$, $a_3$, $a_4$, $a_5$, respectively, in accordance with said first, second, third, fourth and sixth equations.

* * * * *